2 Sheets—Sheet 1.

C. P. SEITZINGER.

APPARATUS FOR CRIMPING WIRE FOR SIEVES.

No. 7,125. Reissued May 23, 1876.

Witnesses;
Granville Lewis
M. Lynch

Inventor
Charles P. Seitzinger
By Hill & Ellsworth
His Attys.

N. PETERS, PHOTO-LITHOGRAPHER, WASHINGTON, D. C.

C. P. SEITZINGER.

APPARATUS FOR CRIMPING WIRE FOR SIEVES.

No. 7,125. Reissued May 23, 1876

Witnesses;
Grenville Lewis
M. Chunch

Inventor:
Charles P. Seitzinger
By Hill & Ellsworth
His Attys.

N. PETERS, PHOTO-LITHOGRAPHER, WASHINGTON, D. C.

UNITED STATES PATENT OFFICE

CHARLES P. SEITZINGER, OF SCRANTON, PENNSYLVANIA.

IMPROVEMENT IN APPARATUS FOR CRIMPING WIRE FOR SIEVES.

Specification forming part of Letters Patent No. 118,283, dated August 22, 1871; reissue No. 7,125, dated May 23, 1876; application filed March 7, 1876.

*To all whom it may concern:*

Be it known that I, CHARLES P. SEITZINGER, of Scranton, in the county of Luzerne and State of Pennsylvania, have invented a new and useful Improvement in Apparatus for Crimping Wires; and I do hereby declare the following to be a full, clear, and exact description of the same, reference being had to the accompanying drawings, forming part of this specification, in which—

Figure 1:
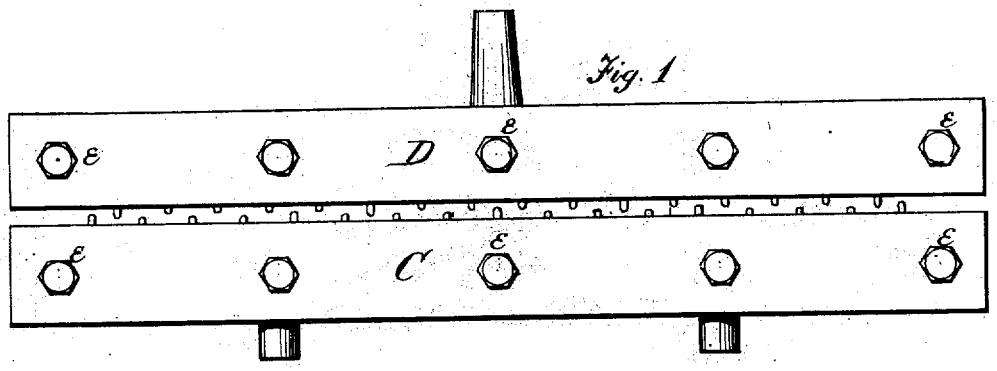
Figure 2:
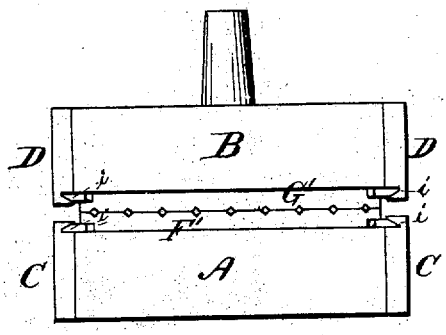
Figure 3:
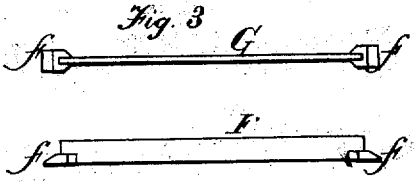
Figure 4:
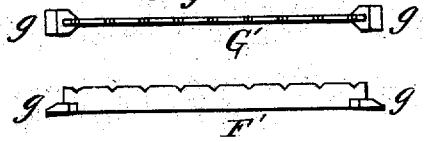
Figure 5:
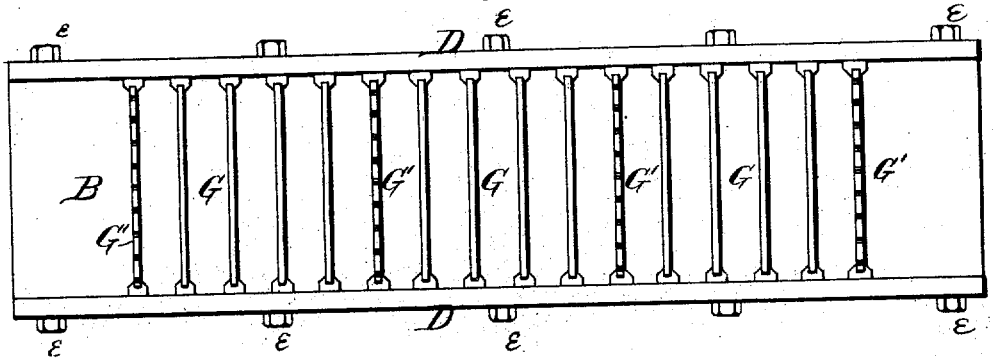
Figure 6:
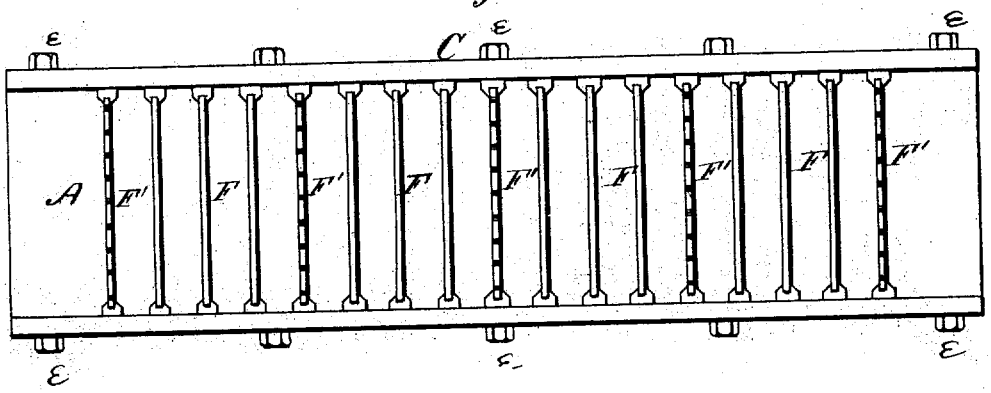
Figure 7:
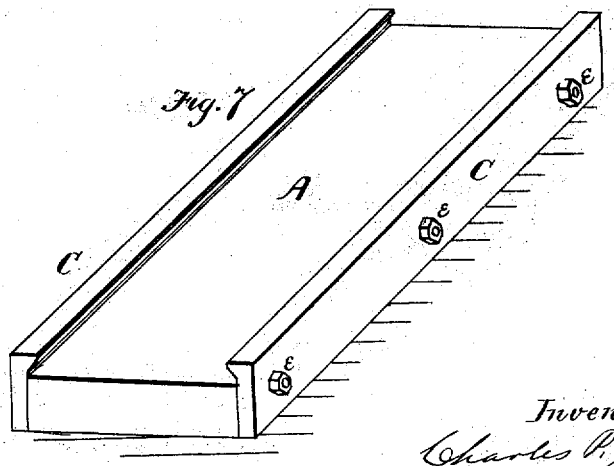

Figure 1 is a side view of a machine embodying my invention. Fig. 2 is an end view of the machine. Fig. 3 represents the notched slats. Fig. 4 represents the plain slats. Fig. 5 is a plan view of the face of the lower block of the machine. Fig. 6 is a similar view of the upper block; and Fig. 7 is a perspective view of one of the side plates.

Similar letters of reference in the accompanying drawings denote the same parts.

In the manufacture of wire-cloth for coal-screens, fences, railing, and other articles of woven wire, it is desirable to first crimp or crinkle throughout the entire length the rods or wires which are to be used for the woof or cross-wires of the fabric, and, to save time and labor, it is also desirable to crimp them not singly, but several at once. This has heretofore been effected in a rude and imperfect manner by placing a number of wires side by side on a series of raised bars, and depressing upon them, between the supporting-bars, a corresponding series of bars attached to some kind of upper frame, so as to bend the wires down between every two supporting-bars, thus forming the downward crimps from that part of the wires which extends between the supporting-bars, and the upward crimps from that part which passes over the supporting-bars. There have been two important disadvantages in the use of this rude apparatus for the purpose referred to, namely, first, the wires were not properly held in the apparatus, and while being crimped were liable to slide toward or from each other and become so disarranged that the crimps might not be properly formed or uniformly spaced; and secondly, the size of the crimps could not be conveniently varied and controlled at the will of the operator.

The object of my invention is to provide for public use a machine which shall not be liable to the objections above referred to; and to this end my invention consists, first, in notching or serrating a portion of the bars or slats used to support and bend the wire, so that when the machine is in operation the wires will each be held in the notches and prevented from lateral movement or displacement; and, secondly, in so constructing the machine that the slats which support and bend the wire can be readily and conveniently adjusted toward or from each other, in order to render the crimps shorter or longer, and thus adapt the crimped wire to be used for a finer or coarser fabric, as may be desired.

In the drawings, A B indicate two iron blocks, each twenty-eight inches, more or less, in length, four inches, more or less, in width, and of suitable thickness. C D represent the side plates, secured to the edges of the blocks A B by means of screws *e e*, so that they can be tightened up or loosened, or altogether detached. F F represent the cross-bars of the lower frame A C; and G G′ the cross-bars of the upper frame B D. The side plates C D are formed with edges, which project beyond the face of the block to which the side plate is attached, and such projecting edge is provided along its inner face with a groove or recess, or space behind a projecting shoulder, one form of which is shown at *i i*. The ends of the cross-bars are fitted to such groove, recess, or space, and are held therein, the bars being clamped in position preferably, by setting the side pieces tightly up against their ends, although other means may be employed for that purpose. The bars can thus be adjusted toward or from each other and fixed in such new position by loosening the screws *e*, moving the bars, and tightening up the screws again. The bodies of the bars lie in vertical planes, and to prevent their turning over under the draft of the wires while the crimping is going on, their ends are flattened out and turned over, so as to lie in horizontal planes, as seen at *f g*. This construction not only holds them more steadily, but adapts them to be slidden along from place to place more quickly and conveniently, since it prevents them from binding and sticking in the grooves. Certain of the cross-bars, upper and lower, or either, are transversely notched or serrated at intervals along their projecting edge, and when the apparatus is in operation the wires lie in these notches, and are thus prevented from displacement. In a machine having thirty-three slats, namely, seventeen in one block and sixteen in the other, I find it advantageous to employ about five notched slats in one block and four in the other; but any other number may be employed, if preferred. If the blocks are four inches wide, nine notches, mere or less, may be employed in each bar. The edges of the smooth bars are beveled or rounded off to form the crimps properly, and the bottom of the grooves in the notched bar are likewise cut so as to make a beveled or rounded bed for the wire, for the same purpose. The edges of the smooth bars F G come on a line with the bottom of the notches in the notched bars, so that when the wires are held in the notches and in contact with the smooth bars they will lie perfectly straight. Thus the edges of the smooth bars of the upper block do not, when the blocks are in the position shown in Fig. 1, come quite to a line with the edges of the smooth bars of the lower block, but there is sufficient space between them to accommodate the wires, whereas the edges of the notched bars of one plate pass beyond a line with the edges of the notched bars of the other plate. This construction is represented in Fig. 1. One set of blocks of this kind will crimp more than thirty different sizes and kinds of meshes.

I claim as my invention—

1. In a wire-crimping apparatus, the bars F′ or G′, notched to hold the wires or rods, and crimp them, as set forth.

2. In a wire-crimping apparatus, the bars F or G, F′ or G′, constructed with the ends *f* or *g*, and adapted to be held and adjusted in the notch, recess, or space *i*, substantially as and for the purposes set forth.

3. The combination of the two metallic blocks, A B, the movable metal bars F G, and the grooved bars F′ G′, fastened by screws or otherwise, substantially as and for the purposes hereinbefore set forth.

CHARLES P. SEITZINGER.

Witnesses:
A. D. SEITZINGER,
R. F. TIENCKEN.